United States Patent
Pazhoor et al.

(10) Patent No.: US 10,530,577 B1
(45) Date of Patent: Jan. 7, 2020

(54) SYSTEMS AND METHODS FOR BIOMETRIC KEY GENERATION IN DATA ACCESS CONTROL, DATA VERIFICATION, AND PATH SELECTION IN BLOCK CHAIN-LINKED WORKFORCE DATA MANAGEMENT

(71) Applicant: Talenting Inc., West Palm Beach, FL (US)

(72) Inventors: Mohamed Pazhoor, West Palm Beach, FL (US); Vinay Kumar, Lake Worth, FL (US); Shankar Ramalingam, Miramar, FL (US); William Inman, Manhattan Beach, CA (US); Daniel Austin, Laguna Beach, CA (US)

(73) Assignee: Talenting, Inc., West Palm Beach, FL (US)

( * ) Notice: Subject to any disclaimer, the term of this patent is extended or adjusted under 35 U.S.C. 154(b) by 0 days.

(21) Appl. No.: 16/271,521

(22) Filed: Feb. 8, 2019

(51) Int. Cl.
*H04L 9/08* (2006.01)
*H04L 9/06* (2006.01)
*H04L 9/32* (2006.01)

(52) U.S. Cl.
CPC .......... *H04L 9/0866* (2013.01); *H04L 9/0618* (2013.01); *H04L 9/083* (2013.01); *H04L 9/3247* (2013.01); *H04L 2209/38* (2013.01)

(58) Field of Classification Search
CPC ..... H04L 9/0866; H04L 9/083; H04L 9/0618; H04L 9/3247; H04L 2209/38
See application file for complete search history.

(56) References Cited

U.S. PATENT DOCUMENTS

| 6,035,398 | A | * | 3/2000 | Bjorn | G06K 9/00006 |
| | | | | | 713/186 |
| 6,310,966 | B1 | * | 10/2001 | Dulude | G06Q 20/04 |
| | | | | | 382/115 |
| 6,954,753 | B1 | * | 10/2005 | Jeran | G06F 21/6218 |
| 9,082,119 | B2 | | 7/2015 | Ortiz et al. | |

(Continued)

OTHER PUBLICATIONS

Guy, et al., Decentralizing privacy: Using blockchain to protect personal data, journal, 2015 IEEE CS Security and Privacy Workshops Retrieved from http://homepage.divms.uiowa.edu/~ghosh/blockchain.pdf.

(Continued)

*Primary Examiner* — Darren B Schwartz
(74) *Attorney, Agent, or Firm* — Caldwell Intellectual Property Law

(57) ABSTRACT

A system for using biometric key generation for data access control and path selection includes an access control regulator operating on a data security management device. The access control regulator receives an access request from a requestor, which may include a biometric signature captured by a biometric reader, locates an encrypted data record in a requestor-linked data store, determines that the requestor is authorized to access the encrypted data record by evaluating biometric keys generated from the requestor, and decrypts the requestor-linked data record. A validator operating on the data security management device may validate data from the encrypted data record using third-party validator devices; validation may be authenticated using further keys, which may also be biometric.

14 Claims, 6 Drawing Sheets

(56) References Cited

U.S. PATENT DOCUMENTS

| | | | |
|---|---|---|---|
| 9,485,098 B1* | 11/2016 | Lepeshenkov | H04L 9/3247 |
| 9,792,742 B2 | 10/2017 | Johnson et al. | |
| 9,892,460 B1 | 2/2018 | Winklevoss et al. | |
| 10,007,809 B1* | 6/2018 | Douglis | G06F 21/6218 |
| 10,026,118 B2 | 7/2018 | Castinado et al. | |
| 2002/0054334 A1* | 5/2002 | Harrison | H04N 1/4413 358/1.15 |
| 2003/0115475 A1* | 6/2003 | Russo | G06K 9/00026 713/186 |
| 2003/0182435 A1* | 9/2003 | Redlich | C07K 14/70575 709/229 |
| 2005/0138110 A1* | 6/2005 | Redlich | C07K 14/70575 709/201 |
| 2005/0234828 A1* | 10/2005 | Matsuyama | G06F 21/10 705/51 |
| 2009/0083833 A1* | 3/2009 | Ziola | G06F 21/31 726/2 |
| 2014/0101719 A1* | 4/2014 | Lakshminarayanan | G06F 21/6245 726/3 |
| 2016/0012424 A1 | 1/2016 | Simon et al. | |
| 2016/0300234 A1 | 10/2016 | Moss-Pultz et al. | |
| 2017/0017936 A1 | 1/2017 | Basikalo et al. | |
| 2017/0251025 A1* | 8/2017 | Varley | H04L 9/3247 |
| 2017/0257358 A1* | 9/2017 | Ebrahimi | H04L 9/3247 |
| 2017/0302458 A1* | 10/2017 | Berger | G06F 21/6218 |
| 2017/0366395 A1* | 12/2017 | Goldfarb | H04L 12/4633 |
| 2018/0152297 A1* | 5/2018 | Fielding | H04L 9/0866 |
| 2018/0232739 A1 | 8/2018 | Battle | |
| 2018/0241558 A1* | 8/2018 | Takahashi | H04L 9/3231 |
| 2018/0253539 A1* | 9/2018 | Minter | G06F 21/32 |

OTHER PUBLICATIONS

Hajialikhani et al., UniqueID: Decentralized Proof-of-Unique-Human, journal, Jun. 20, 2018 Retrieved from https://arxiv.org/pdf/1806.07583.pdf.

Gemalto & R3, Gemalto and R3 pilot blockchain technology to put users in control of their Digital ID, Sep. 18, 2018 Retrieved from Proquest.

Benli et al., BioWallet: A Biometric Digital Wallet, journal, ICONS 2017 : The Twelfth International Conference on Systems, Dec. 31, 2017 Retrieved from https://www.thinkmind.org/download.php?articleid=icons_2017_3_10_40006.

Eskandari et al., A first look at the usability of bitcoin key management, journal, Feb. 12, 2018 Retrieved from https://arxiv.org/pdf/1802.04351.pdf.

* cited by examiner

SYSTEMS AND METHODS FOR BIOMETRIC KEY GENERATION IN DATA ACCESS CONTROL, DATA VERIFICATION, AND PATH SELECTION IN BLOCK CHAIN-LINKED WORKFORCE DATA MANAGEMENT

FIELD OF THE INVENTION

The present invention generally relates to the field of data collection and data processing. In particular, the present invention is directed to systems and methods for biometric key generation in data access control, data verification, and path selection in block chain-linked workforce data management.

BACKGROUND

Data security has become increasingly important in the information age. Users increasingly store their data on devices or in services not directly under user control, such as cloud services. Such data is frequently secured with user passwords. User passwords have become multifarious whereby a user must make a new password sometimes for every transaction that a user may want to engage in. Remembering passwords and retaining control over user data can be complex as hackers are able to circumvent security measures to gain access to user information. It has also proved difficult to determine if data under the control of a particular user is accurate, particularly when such data is being used in turn to gain access to further resources, credentials, or other material. Inaccurate or fraudulent data can be used in turn to gain unwarranted access to further data.

SUMMARY OF THE DISCLOSURE

In an aspect, a system for biometric key generation in data access control and path selection is disclosed. The system includes a biometric reader designed and configured to capture a biometric sample from a requestor and generate a unique biometric key associated with the requestor. The system includes a data security management device in communication with the biometric reader. The system includes an access control regulator operating on the data security management device. The access control regulator is designed and configured to receive a data access request including the unique biometric key associated with the requestor, locate in a requestor-linked data store, at least an encrypted data record as a function of the data access request, wherein the at least an encrypted data record is linked to a digital signature associated with the requestor, determine that the requestor is authorized to access the at least an encrypted data record, wherein determining further comprises matching the unique biometric key to the digital signature associated with the requestor, and determine as a function of the matching, that the requestor is authorized to access the at least an encrypted data record, and decrypt the at least an encrypted data record based on the determination that the requestor is authorized to access the data record. The system includes a data integrity validator operating on the data security management device. The data integrity validator is designed and configured to validate stored requestor information, wherein validating further comprises transmitting to at least a third-party validator device of stored requestor information a validation request, receiving from the at least a third-party validator device a validation record including a third-party digital signature validating the at least an encrypted data record, authenticating the third-party digital signature, and validating the at least an encrypted data record as a function of the validation record.

In another aspect, a system for biometric key generation in data access control and path selection is disclosed. The system includes a data security management device. The system includes an access control regulator operating on the data security management device. The access control regulator is designed and configured to receive a data access request including a unique key associated with a requestor, locate in a requestor-linked data store at least an encrypted data record as a function of the data access request, determine that the requestor is authorized to access the at least an encrypted data record as a function of the unique key associated with the requestor. The system includes a data integrity validator operating on the data security management device. The data integrity validator is designed and configured to validate stored requestor information, wherein validating further comprises transmitting to the at least a third-party validator device of stored requestor information a validation request, the validation request providing access to at least a datum of the data record to the at least a third-party validator device, receiving from the at least a third-party validator device a validation record including a third-party digital signature validating the at least an encrypted data record, authenticating the third-party digital signature, and validating the at least an encrypted data record as a function of the validation record.

In another aspect, a method for using key generation for data access control and path selection is disclosed. The method includes receiving by an access control regulator operating on a data security management device a data access request including a unique key associated with a requestor, locating in a requestor-linked data store, at least an encrypted data record as a function of the data access request, determining that the requestor is authorized to access the at least an encrypted data record as a function of the unique key associated with the requestor, decrypting the at least an encrypted data record based on the determination that the requestor is authorized to access the data record, and validating by a data integrity validator operating on the data security management device, the data record wherein validating further comprises transmitting to at least a third-party validator device of stored requestor information a validation request, receiving from the at least a third-party validator device a validation record including a third-party digital signature, and validating the at least an encrypted data record as a function of the validation record.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
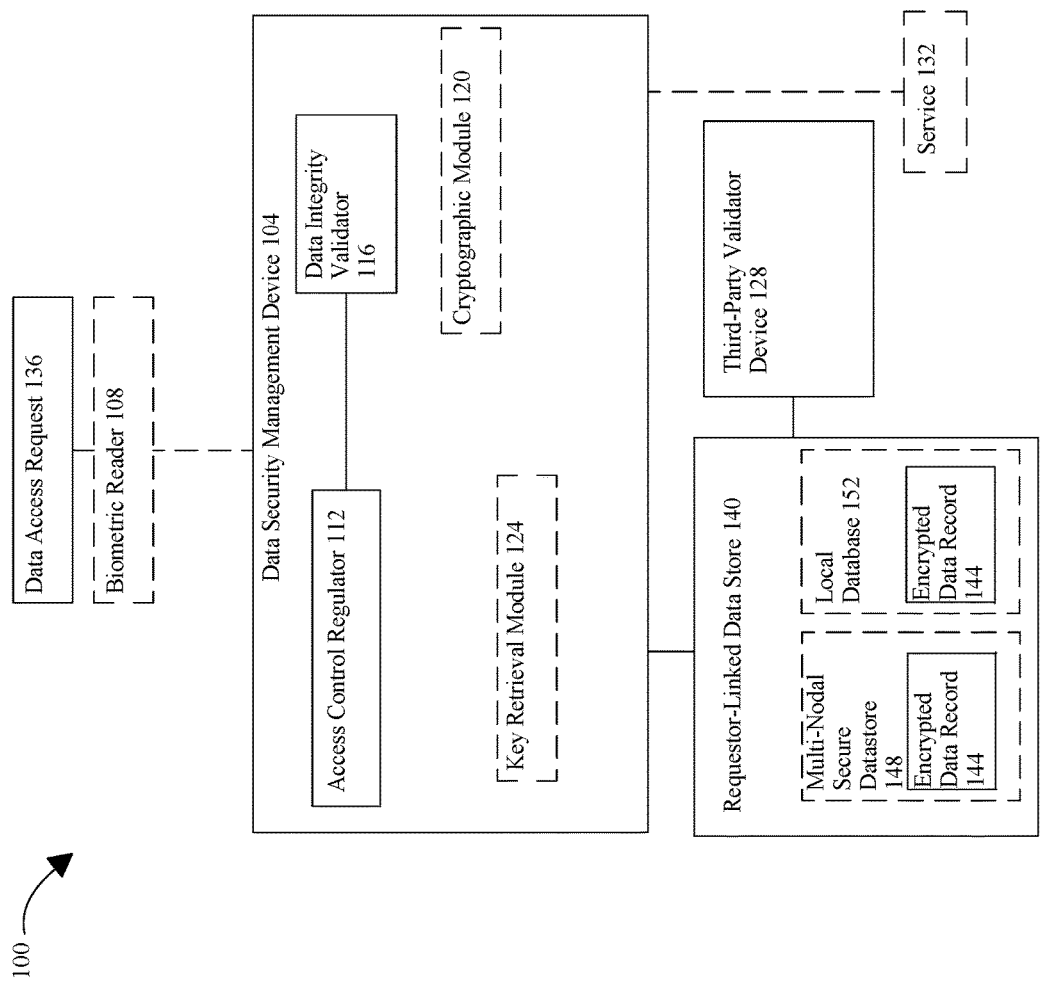
FIG. 1 is a block diagram of an exemplary embodiment of a system for using biometric key generation for data access control and path selection.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating biometric keys uniquely linked to a requestor for authentication and verification of data attributed to requestor. In an embodiment, disclosed systems and methods may provide for unique biometric key generation by scanning a bodily feature of a requestor, or otherwise acquiring biometric data linked to the requestor. A biometric key may be linked to requestor data entered into an applicant tracking system and may be used to authenticate and/or identify a user seeking access to information. Requestor data may be stored multiple locations. Requestor data may be validated by at least a third-party validator device. After validation, at least a third-party validator device may transmit requestor data to a data segregator for subsequent storage and use. Authenticated requestor-data may also be transmitted to a service. Embodiments of the disclosed system and method may improve the manner in which computing devices and systems engage in user authentication and data access regulation. Use of biometric identification as set forth in further detail herein may make it more difficult adverse parties to steal or spoof user credentials; need for users to remember passwords may also be eliminated. Methods described herein may improve implementation of data storage protocols by keying such storage to user biometric identifiers or other credentials. Embodiments of the disclosed system and methods may further enhance data security by subjecting data to validation according to signature-based data validation protocols; this may in turn make computing systems more robust against attacks using "social engineering" strategies to gain access credentials fraudulently.

Systems and methods described herein may be used to validate data records for the purposes of human resources, workforce management, talent management, hiring and employment decisions, or the like. Verification of data may include talent verification, verification of career data and/or history, verification of skills, background, education, and/or employment history, or any other suitable or useful application of data verification. In an embodiment, data verification may be combined with a scoring system rating data contents in order to understand the value of the secure data; a score generated by an algorithm based on user data records may be created for each user. Scoring system may include, without limitation, a career scoring system producing a dynamic rating that represents, for instance in the form of a numerical score, a degree of employability, suitability for a job, gig, or career opportunity, suitability for admission to an academic institution, or the like. Such data verification, scoring, and related functionality may be used to manage human capital and/or to track activity and history of gig work and/or work in the gig economy; in an embodiment the ability to track and verify large numbers of data from disparate sources in a decentralized data structure improves the ability to verify and score activity related to gig work and other freelance or short-duration economic activity.

In an embodiment, methods and systems described herein may implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption process may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is Rivest-Shamir-Adleman (RSA), in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Some embodiments of the disclosed systems and methods involve creation and/or evaluation of digital signatures. A digital signature as used herein is an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way compression function, and thus inherently loses data, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Some embodiments of the disclosed systems and methods involve creation and/or evaluation of digital signatures. A digital signature as used herein is an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

Referring now to FIG. 1, an exemplary embodiment of a system 100 for using biometric key generation in data access control and path selection is illustrated. System 100 includes a data security management device 104. Data security management device may include any computing device as described below in reference to FIG. 6. Data security management device may include, without limitation, a server, a desktop computer, a handheld device or mobile device such as a smartphone or tablet, and/or a special purpose device incorporating, as a non-limiting example, a biometric reader as described in further detail below. Data security management device 104 may include two or more devices working in concert or in parallel; data security management device 104 may include, for instance, a first server or cluster of servers in a first location and a second server or cluster of servers in a second location. Data security management device 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Data security management device 104 may include one or more computing devices dedicated to data storage, security, distribution of traffic for load balancing, and the like. Data security management device 104 may distribute one or more computing tasks as described below across a plurality of computing devices of data security management device 104, which may operate in parallel, in series, redundantly, or in any other manner used for distribution of tasks or memory between computing devices. Data security management device 104 may be implemented using a "shared nothing" architecture in which data is cached at the worker; in an embodiment, this may enable scalability of system 100 and/or data security management device 104. Data security management device 104 may be configured to determine access rights of a requestor; a requestor as used herein is a user who may be requesting access to stored data or to access one or more encrypted data records as described in further detail below, where access to data may include having the data provided to the requestor, or having the data provided by the requestor to another party as described in further detail below. Data security management device 104 may be configured to perform validation of data according to methods and/or systems as described in further detail below. In an embodiment, data security management device 104 may communicate locally or over a network to one or more remote devices to perform one or more embodiments of processes and/or process steps as disclosed in further detail below. One or more remote devices may include and/or implement one or more network accessible knowledge bases containing information of one or more users that may include other secure processors connected to the network. One or more remote devices may include nodes of a multi-nodal secure datastore. One or more remote devices may include, without limitation, at least a user device, at least a third-party validator device, and/or a service 132 or component thereof, as described in further detail below.

Still referring to FIG. 1, system 100 may include a biometric reader 108. Biometric reader 108 may receive and/or capture biometric data, which may be referred to herein interchangeably as "biometrics," by detecting, measuring, or otherwise capturing one or more physiological, behavioral, or biological patterns, qualities, or characteristics identifying a particular person; identification may be unique, or may be effectively unique by, for instance, being highly improbable to be replicated by capturing biometrics of a different person. Physiological qualities may refer to something that a user is, while behavioral qualities may refer to something that a user can do. Biometric reader 108 may be incorporated in data security management device 104. Biometric reader 108 may function as and/or include a module or component of data security management device 104. Alternatively or additionally, biometric reader 108 may include a device connected to or in communication with data security management device 104, such as peripheral device connected or paired to data security management device 104 via a wired or wireless connection, a device connected to data security management device 104 via a wired or wireless connection, or the like. Biometric reader 108 may include one or more components of hardware/and/or software program code for receiving and/or obtaining a biometric signature of a requestor. Biometric signature may be generated from biometrics using a biometric sensor scanning a bodily feature of a requestor. Biometric sensor may include a scanner or reader or other input mechanism that may scan, read, analyze, or otherwise obtain a biometric signature produced from a bodily feature of a requestor. Biometric scanner may have a transmitter for transmitting scanned biometric data and/or biometric signature to data security management device 104. Bodily feature may include a face, a finger, a thumb, an eye, an iris, a retina, a blood composition, a skin or tissue, and the like. Biometric sensor may include an optical scanner which may rely on capturing an optical scanner which may rely on capturing an optical image such as a photograph to capture a bodily feature of a requestor. Biometric sensor may include capacitive scanners which may use capacitor circuits to capture a bodily feature of a requestor. A capacitive scanner may include an array of capacitive proximity sensors connected to a processor and electronic signal processing circuits to detect a bodily feature of a requestor. Ultrasonic scanners may use high-frequency sound waves to detect a bodily feature of a requestor. Ultrasonic scanners may include an ultrasonic transmitter and receiver. In an embodiment, an ultrasonic pulse may be transmitted over whenever stress is applied so that some of the pulse is absorbed and some is reflected back to a sensor that may detect stress. Intensity of returning ultrasonic pulse at different points on the scanner may result in capturing a bodily feature of a requestor. In an embodiment, biometric signature of the requestor may be used to decrypt an encrypted private key, encrypted data record, digital signature, or other cryptographically secured or generated datum associated with the requestor.

With continued reference to FIG. 1, biometric data and/or biometric keys may include and/or be generated from behavioral biometrics. Behavioral biometrics may include, without limitation, one or more elements of data describing person-specific patterns of movement, action, response time, or the like. As a non-limiting example, behavioral biometric data may include keystroke dynamics, which may be used to authenticate a person's identity wholly or in part from their typing behavior; for instance, a person may type with a cadence, rhythmical pattern, or the like that is unique to that person, and can be used to differentiate that person from most or all other people. Keystroke dynamics may be recorded using a manual data entry device such as a keyboard, keypad, touchscreen or the like that a person to be authenticated is using for data entry, and/or by a device, such as without limitation a computing device as described in further detail below in reference to FIG. 6, which receives data either directly or remotely from a manual data entry device; keystroke dynamics may be recorded from a person that is not aware that the keystroke dynamics are being recorded, for instance upon asking the person to enter other data to be used in validation or authentication. A further non-limiting example of behavioral biometric data may include data generated by recording or analysis of a person's gait, such as without limitation a walking gait; gait data may be recorded by a motion sensor attached to or recording the movement of the person in question. Motion sensor may include optical motion sensors, cameras, accelerometers, gyroscopes, magnetic field sensors, inertial measurement units, or the like. Gait biometrics may be recorded with or without the knowledge of the subject to be authenticated. Persons skilled in the art, upon reviewing the entirety of this disclosure, will be aware of various forms of physiological, behavioral, and/or other biometrics that may be recorded and/or used to generate biometric keys consistently with this disclosure.

Continuing to refer to FIG. 1, characteristics may be extracted from the biometric sample that may be specific to requestor, which may then be filtered and used to generate a unique biometric key. After a unique biometric key has been generated, a hash corresponding to the unique biometric key may be calculated and stored for later authentication purposes. For example, a biometric sensor scanning a fingerprint of a requestor may use capacitance scanning to detect features such as arches, whorls, loops, edges, minutiae, and furrows of the requestor's fingerprint. Once captured, captured bodily feature of a requestor may be analyzed to look for distinctive and unique attributes which can be used to generate a unique biometric key associated with a requestor. In yet another nonlimiting example, a biometric sensor scanning an iris may capture more than 250 distinguishing characteristics of a requestor's iris. Once captured, an iris scan may be analyzed to detect unique patterns of the outer radius of iris patterns and pupils characteristic of a specific requestor. Unique characteristics that may be detected may then be used to generate a key. In an embodiment, biometric sensor may be unimodal, whereby it scans a single bodily feature of a requestor. In an embodiment, biometric sensor may be multimodal, whereby it scans two or more bodily features of a requestor. For example, a multimodal biometric sensor may scan a fingerprint and an iris of a requestor. A multimodal biometric sensor may employ one sensor to scan two or more bodily features of a requestor or a multimodal biometric sensor may employ two or more sensors to scan two or more bodily features of a requestor.

Continuing to refer to FIG. 1, data security management device 104 may include one or more modules, which may include without limitation an access control regulator 112, a data integrity validator 116, a cryptographic module, a key retrieval module 124, and/or a biometric module containing, included in, and/or communicating with biometric reader 108. A module, as used herein, may include hardware or software, or may be a combination of both hardware and software. Hardware modules may include chipsets, specialized circuitry, and/or one or more memory devices. Software modules may include a program code or link to the program code containing specific programmed instructions, which may be loaded in the memory of data security management device 104. A module whether hardware, software, or a combination thereof, may be designed to implement or execute one or more particular functions or routines.

Still referring to FIG. 1, system 100 may include an access control regulator 112 operating on the data security management device 104. Access control regulator 112 may be implemented as any hardware or software module as described above. Access control regulator 112 may be configured to determine if a requestor will be granted permission to stored data. Access control regulator 112 may be designed and configured to perform any embodiment of any process step and/or set of process steps, including without limitation as described herein in reference to FIG. 4 and/or FIG. 5. For instance, and without limitation, access control regulator 112 may be designed and configured to receive a data access request including a unique biometric key and/or unique key associated with a requestor, locate, in a requestor-linked data store, at least an encrypted data record as a function of the data access request, wherein the at least an encrypted data record is linked to a digital signature associated with the requestor, determine that the requestor is authorized to access the at least an encrypted data record, wherein determining further comprises matching the unique biometric key and/or unique key to the digital signature associated with the requestor, and determining, as a function of the matching, that the requestor is authorized to access the at least an encrypted data record, and to decrypt the at least an encrypted data record based on the determination that the requestor is authorized to access the data record, as set forth in further detail below. As a further non-limiting example, access control regulator 112 may be designed and configured to receive a data access request including a unique biometric key and/or unique key associated with a requestor, located in a requestor-linked data store at least an encrypted data record as a function of the data access request, determine that the requestor is authorized to access the at least an encrypted data record as a function of the unique biometric key and/or unique key associated with the requestor, and decrypt the at least an encrypted data record based on the determination that the requestor is authorized to access the data record.

In an embodiment, and continuing to refer to FIG. 1, encrypted data record may contain one or more elements of data belonging to and/or describing a requestor as set forth in further detail in this disclosure. One or more elements of data may include biographical data as described in further detail below. One or more elements of data may be collected and/or received from one or more different nodes corresponding to, without limitation, devices operated by or associated with, managers, peers, colleagues, friends, or the like. One or more elements of data may include data containing feedback concerning requestor from any person including without limitation managers, peers, colleagues, friends, or the like. One or more elements of data may include verified data concerning or belonging to requestor; verified data may include data previously validated according to any process described in this disclosure for data validation. One or more elements of data may include at least a score calculated regarding requestor and/or requestor data, including without limitation one or more career scores, verifier scores, or any other scores as described in further detail below.

Still referring to FIG. 1, system 100 may include a data integrity validator 116. Data integrity validator 116 may be implemented as any hardware or software module as described above. Data integrity validator 116 may be designed and configured to perform any embodiment of any process step and/or set of process steps, including without limitation as described herein in reference to FIG. 4 and/or FIG. 5. For instance, and without limitation, data integrity validator 116 operating on the data security management device 104 may be designed and configured to validate stored requestor information, wherein validating further comprises transmitting, to at least a third-party validator device of stored requestor information a validation request, receiving, from at least a third-party validator device a validation record including a third-party digital signature validating the at least an encrypted data record, authenticating the third-party digital signature, and validating the at least an encrypted data record as a function of the validation record. As a further non-limiting example, data integrity validator 116 may be designed and configured to validate stored requestor information, wherein validating further comprises transmitting to the at least a third-party validator device of stored requestor information a validation request, the validation providing access to at least a datum of the data record to the at least a third-party validator device, receiving from the at least a third-party validator device a validation record including a third-party digital signature validating the at least an encrypted data record, authenticating the third-party digital signature, and validating the at least an encrypted data record as a function of the validation record.

Continuing to view FIG. 1, data security management device 104 and/or biometric reader 108 may include a cryptographic module 120 operating and/or executing on data security management device 104 and/or biometric reader 108; a cryptographic module may also operate on any remote device as described or alluded to herein. Cryptographic module 120 may include one or more components of hardware and/or software program code for performing one or more cryptographic operations as described above, including encryption and/or decryption of text, generation and/or validation of digital signatures, and/or generation and/or validation of cryptographic hashes and/or public and private key pairs as described in further detail below. As described above, public key and private key may include two uniquely related cryptographic keys that may function to encode information. Both keys may work in either symmetric and asymmetric encryption systems. Symmetric encryption may utilize the same key for encryption and decryption. Asymmetric encryption may utilize a pair of keys such as a public and a private key whereby a message can be encrypted with a public encryption key and may only be decrypted with a private key. A public key may be made available to everyone via a publicly accessible repository or directory. A public key may use asymmetric algorithms to convert data such as a message into an unreadable format. An individual who has a public key may encrypt the data intended for a specific receiver. The receiver with the private key can only decode the data which may be encrypted by the public key. A private key may be kept confidential to its respective owner, who may include, without limitation, a requestor as further described herein. A private key may include a secret key that may be used to decrypt the data. In an embodiment, a public and private key pair may be mathematically related, so that whatever is encrypted with a public key may only be decrypted by its corresponding private keys. A public key and a private key may be generated by a number of different algorithms. This may include for example, RSA, digital signature algorithm (DSA), and/or elliptic curve cryptography (ECC). In an embodiment, a public and private key may be generated from a requestor biometric sample. This may be done by first acquiring from a biometric scanner a bodily feature, movement, or other biometric data of a requestor. A bodily feature and/or movement may then be processed so that unique and distinguishing features may be extracted and then used to produce a cryptographic key. A cryptographic key may include at least one of a public and private key. In an embodiment, a public key generated from a requestor biometric sample may be publicly available, such as on a network.

With continued reference to FIG. 1, cryptographic module 120 may generate a key from non-biometric data, including without limitation secret data provided by a person, such as a requestor as described in further detail below. Secret data may include, without limitation, a password, passphrase, number, or other element of information known to or available to a person providing the secret data; the secret data may be generated by a hard-token or other device in the possession of person providing secret data. Persons skilled in the art, upon reviewing the entirety of this disclosure, will be aware of a nearly limitless variety of sources and/or origins for secret data as used in this disclosure. Any secret data may be used to generate any key, including without limitation any public or private key, and/or to create any digital signature, which may be generated and/or created using biometric data.

In an embodiment, and still viewing FIG. 1, a private key generated from a requestor may be available only to a requestor, for example, or may be stored in a key retrieval module as described in more detail below. Cryptographic module 120, data security management device 104, and/or biometric reader 108 may generate keys by integer factorization, discrete logarithm, and/or elliptic curve relationships cryptographic module 120, data security management device 104, and/or biometric reader 108 may use metadata and/or data contained in a biometric signature of a requestor to decrypt an encrypted private key and/or data record. In yet another non-limiting example, cryptographic module 120, data security management device 104, and/or biometric reader 108 may generate a public and private key pair used to generate digital signatures of a requestor. Cryptographic module 120, data security management device 104, and/or biometric reader 108 may also convert plaintext into ciphertext through the process of encryption which may include applying specific algorithms such as for example, Triple Data Encryption Standard (Triple DES) algorithm, RSA, AES algorithm, Blowfish algorithm, and/or Twofish algorithm. Cryptographic module 120, data security management device 104, and/or biometric reader 108 may also perform cryptographic hash functions whereby an input may be converted to an output fixed length hash, that may be used for example to produce a digital signature. Cryptographic module 120, data security management device 104, and/or biometric reader 108 may also generate zero-knowledge proof so that for example, a requestor can prove to another party such as a third-party validator that requestor possess knowledge of certain information without revealing the information. Cryptographic module 120, data security management device 104, and/or biometric reader 108 may also generate public and/or private keys.

With continued reference to FIG. 1, system 100 may include a key retrieval module 124. Key retrieval module 124 may include one or more components of hardware and/or software program code for retrieving, obtaining, or otherwise receiving, and/or processing a public key and/or an encrypted private key from a requestor. In an embodiment, this may include a public key and an private key, which may include an encrypted private key generated from a biometric feature of a requestor, from secret data provided by requestor or by any other suitable means for generation of a private or public key; encrypted private key may be encrypted using any cryptographic system as described above, including without limitation a cryptographic system using additional private or public keys generated from biometric features and/or secret data of requestor. Key retrieval module 124 may also store for example, a public key associated with a requestor for later use within system 100, such as when cryptographic module 124 or other devices and/or modules within or in communication with the system 100 may need to encrypt a message using requestor's public key. Key retrieval module 124 may also store a requestor's private key for later use within system 100. For example, key retrieval module may store an encrypted private key associated with a requestor. The encrypted private key may be decrypted by a biometric signature of requestor generated by biometric reader 108, and/or other signature generated using secret data of requestor as described above. In an embodiment, a public key may be utilized to encrypt a message while the message can only be decrypted using a private key. In an embodiment, a public key may be widely distributed, while a private key may be known only to its proprietor. In an embodiment, key retrieval module 124 may store an encrypted private key that may only be decrypted using a biometric sample from a requestor and/or other secret data from requestor. In yet another non-limiting embodiment, a biometric sample and/or other secret data may be used to generate the private key and the biometric sample and/or other secret data may be used to decrypt the private key.

With continued reference to FIG. 1, system 100 includes third-party validator device 128. Third-party validator device 128 includes one or more remote devices communicating with data security management device 104 operated by a third-party. At least a third-party validator device 128 may include any device or set of devices suitable for use as data security management device 104 as described above. At least a third-party validator device 128 may include modules such as biometric reader 108, cryptographic module 120, and/or key retrieval module 124. At least a third-party validator device 128 may be operated by a user. A user may include a third party who may have a relationship with a requestor and who may validate information pertaining to requestor. For example, this may include an individual who may have worked with requestor in the past, or who may currently work with requestor. This may also include peers such as a mentor that requestor may have interned for. Third-party may be an authorized person from an organization requestor volunteered at or may be a hiring manager or human resources manager who kept employment records pertaining to requestor. A third-party may validate information pertaining to requestor such as employment history, requestor demographics, education, skills, social activities, and/or academic details. In an embodiment, a third party may include social media sources instead of a person who is able to verify information pertaining to a requestor. For example, a third party may include a processor that may engage in web crawling to confirm requestor activity in social engagements such as by checking websites of organizations and clubs where requestor may engage in social engagements. For example, a processor may verify if a requestor was a volunteer at requestor's church by web crawling to requester's church website and examining the website to see if requestor may be listed as a volunteer. Web crawling may include checking related websites and other sources of information that may indicate clues in reference to requestor social engagements, for example.

Continuing to refer to FIG. 1, data security management device 104 may communicate with at least a service 132. Service 132 may be implemented as software-as-a-service (SaaS) and may receive a validation record and/or rely on determinations of system 100 regarding the validation record to perform one or more services using the validation data. Validation record may be transmitted by data security management device 104 and/or third-party validator device 128 as a means to indicate that information pertaining to a requestor has been independently verified and/or authenticated. Service 132 may operate on a device, which may include any device as described previously above, including a remote device, or on a combination of remote devices in, as a non-limiting example, a cloud configuration. Service may include a single processor operating independently, or may include two or more processors operating in concert, in parallel, sequentially or the like; two or more processors may be included together in a single computing device or in two or more computing devices. Service 132 may be selected based on at least a computer algorithm and may include for example recruitment service, electronic learning service, job board service, mentoring service, vendor management service, and/or payroll service. Service 132 may also be selected based on information contained within a validation record. For example, whereby validation record pertains to employment history of requestor, service 132 may include recruitment service whereby recruiters can provide input such as jobs that may be of interest to requestor based on a validation record pertaining to employment history of requestor. Recruitment service 132 may include a listing of currently open positions if requestor is seeking new employment. Recruitment service may include a listing of jobs requestor may be qualified for. Service 132 may include electronic learning services that requestor may need to utilize in order to be able to use recruitment service to be eligible for a new position. Electronic learning may include courses and/or videos that may assist requestor in obtaining licensure or certification. Electronic learning service may be recommended and/or selected based on a computer algorithm and/or validation record. Service 132 may include mentoring whereby requestor may obtain advice on ways to enhance requestor's career. Mentoring may match requestor up with an individual who may work in requestor's field of employment and who may be able to offer tips and advice to requestor. Service 132 may include vendor management service and/or payroll service.

Continuing to refer to FIG. 1, data security management device 104 may receive a data access request 136. Data access request 136 may include a request by requestor to access requestor-linked data store. Data access request 136 may include a unique biometric key and/or unique key associated with the requestor. Unique biometric key and/or unique key associated with the requestor may include a unique biometric key and/or unique key associated with a requestor which may be generated from a biometric scan performed at biometric reader 108.

Continuing to refer to FIG. 1, system 100 may include a requestor-linked data store. Requestor-linked data store 140 may store and/or make available for retrieval data which requestor or other user may have a right to access; data may include data pertaining to requestor, such as without limitation a biographical or professional profile of requestor. Requestor-linked data store 140 may include data generated and obtained from requestor and stored in requestor-linked data store 140. Data pertaining to, generated by, or obtained from requester may be stored in an encrypted data record. Encryption may include converting plaintext in a readable form to an encoded version that may only be decoded with a decryption key. Encryption may be performed by cryptographic module 120, and encryption may be performed using any of the methods and algorithms as described above. Requestor-linked data store 140 may be located at a local or global network address such an internet protocol address (IP address) and/or uniform resource locator (URL). Data in requestor-linked data store 140, including without limitation encrypted data record, may be linked to requestor by one or more credentials or other data; for instance, data in requestor-linked data store 140 may be linked to a digital signature associated with requestor. Digital signature may be generated using a public-private key pair associated with requestor. Public-private key pair may be generated from a requestor biometric sample as described in more detail above. In an embodiment, requestor may use a public biometric key to encrypt information contained in requestor-linked data store 140 and requestor may use a private biometric key to decrypt information contained in requestor-linked data store 140 and/or to gain access to requestor-linked data store. Requestor may share a public biometric key with others who may be able to encrypt requestor-linked data store 140 but only requestor who may be in possession of a private biometric key may be able to obtain access and decrypt requestor-linked data store. In an embodiment, public biometric key and/or private biometric key linked to requestor may be stored in key retrieval module 124, as described in more detail above.

Continuing to refer to FIG. 1, requestor-linked data store 140 may store an encrypted data record 144. Encrypted data record 144 may include profile data relating to requestor such as for example requestor demographics including requestor name, age, date of birth, address, phone number, email address, social security number, driver license number, passport number, employment history, skills, academic details, and/or social engagements and activities. In an embodiment, requestor may generate a profile which may gather this information. In an embodiment, some of this information may be obtained automatically through social media and/or information available on the internet. For example, employment history may be auto-generated from any information requestor may have posted on a professional and/or social networking site, or a job database and resume uploading site. As requestor makes a profile, requestor may be able to edit and update this information so that old resumes or old employment history can be modified to account for current employment status and/or other changes in employment history that may not have been updated professional and/or social networking site, or a job database and resume uploading sites, for instance. Data record may be encrypted, whereby the information is encoded in such a way that only authorized parties can access it and those who are not authorized cannot. In an embodiment, data record generated by requestor may be available as plaintext. Data record may then be encrypted using an encryption algorithm which may generate a ciphertext that may only be read if decrypted. In an embodiment, encryption may be performed using public and private keys which may be generated using true random number generators and/or pseudo-random generators. A public key may be made available for anyone to use and encrypt data whereas a private key may be held by a single party who has access to decrypt and read the data. In an embodiment, encrypted data record 144 may generate a public key that may be available publicly, whereby a private key that may decrypt data record may be held by requestor.

With continued reference to FIG. 1, requestor-linked data store 140 may be located on a multi-nodal secure datastore 148. Multi-nodal secure datastore 148 may include shared and synchronized digital data which may be spread across multiple sites. Multi-nodal secure datastore 148 may be stored and/or implemented on two or more nodes that may be connected by a network, such as on a peer-to-peer network. A node may include a device such as data security management device 104, any remote device, or the like. Nodes may be connected by a network and share information through a distributed ledger. A distributed ledger may be spread across several nodes on a peer-to-peer network whereby each node replicates and saves an identical copy of the ledger and updates itself independently. There may be no central administrator or centralized data storage of information and/or data located on a multi-nodal secure datastore 148. As information is entered onto and updated on a distributed ledger shared by nodes on the multi-nodal secure datastore 148, each node may construct the new transaction. Nodes may then vote by a consensus algorithm as to which copy is correct. Consensus algorithms may include proof of work, proof of stake, or voting systems. Once a consensus has been determined, all other nodes may update themselves to reflect the new copy of the ledger. Nodes may be connected through a peer-to-peer networking whereby nodes are equally privileged and equipotent participants. A peer-to-peer network may include a network of nodes that may make a portion of their resources available to other network participants. This may include resources such as processing power, disk storage or network bandwidth. Nodes located on a peer-to-peer network may both supply and consume resources. Multi-nodal secure datastore 148 may utilized cryptographic keys and digital signatures to ensure node security and/or authenticity. Multi-nodal secure datastore 148 may utilize digitally signed assertions as described in more detail below in reference to FIG. 2.

Figure 2:
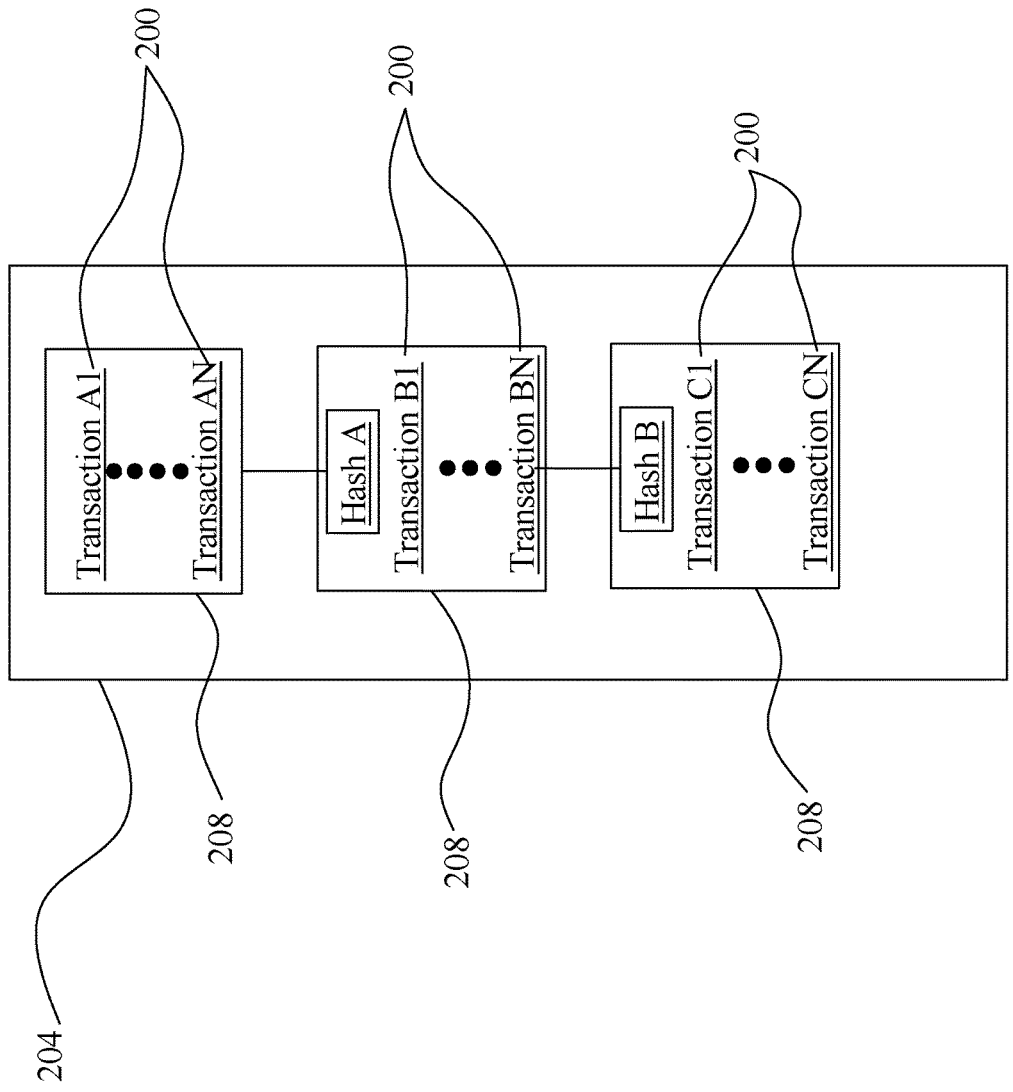
FIG. 2 is a block diagram of an exemplary embodiment of a temporally sequential listing.

Referring now to FIG. 2, system 100 may be used to perform one or more processing steps necessary to create, maintain, and/or authenticate at least a digitally signed assertion 200. In one embodiment, at least a digitally signed assertion 200 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 200. In an embodiment, collection of textual data states that the owner of a certain transferable item represented in the at least a digitally signed assertion 200 register is transferring that item to the owner of an address. At least a digitally signed assertion 200 may be signed by a digital signature created using the private key associated with the owner's public key, as described above. For instance, at least a digitally signed assertion 200 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. At least a digitally signed assertion 200 may describe the transfer of a physical good; for instance, at least a digitally signed assertion 200 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with the at least a digitally signed assertion 200 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in at least a digitally signed assertion 200. In some embodiments, address is linked to a public key, the corresponding private key of which is owned by the recipient of the at least a digitally signed assertion 200. For instance, address may be the public key. Address may be a representation, such as a hash, of the public key. Address may be linked to the public key in memory 108 of a computing device, for instance via a "wallet shortener" protocol. Where address is linked to a public key, a transferee in the at least a digitally signed assertion 200 may record a subsequent at least a digitally signed assertion 200 transferring some or all of the value transferred in the first at least a digitally signed assertion 200 to a new address in the same manner. At least a digitally signed assertion 200 may contain textual information that is not a transfer of some item of value in addition to, or as an alternative to, such a transfer. For instance, as described in further detail below, at least a digitally signed assertion 200 may indicate a confidence level associated with a distributed storage node as described in further detail below.

With continued reference to FIG. 2, at least a digitally signed assertion 200 may be included in a temporally sequential listing 204. Temporally sequential listing 204 may include any set of data used to record a series of at least a digitally signed assertion 200 in an inalterable format that permits authentication of such at least a digitally signed assertion 200. In some embodiments, temporally sequential listing 204 records a series of at least a digitally signed assertion 200 in a way that preserves the order in which the at least a digitally signed assertion 200 took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 2, temporally sequential listing 204 may preserve the order in which the at least a digitally signed assertion 200 took place by listing them in chronological order; alternatively or additionally, temporally sequential listing 204 may organize digitally signed assertions 200 into sub-listings 208 such as "blocks" in a blockchain, which may be themselves collected in a temporally sequential order; digitally signed assertions 200 within a sub-listing 208 may or may not be temporally sequential. The ledger may preserve the order in which at least a digitally signed assertion 200 took place by listing them in sub-listings 208 and placing the sub-listings 208 in chronological order. The temporally sequential listing 204 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion 200 to the ledger but may not allow any users to alter at least a digitally signed assertion 200 that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Temporally sequential listing 204 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, temporally sequential listing 204, once formed, cannot be altered by any party, no matter what access rights that party possesses. For instance, temporally sequential listing 204 may include a hash chain, in which data is added during a successive hashing process to ensure non-repudiation. Temporally sequential listing 204 may include a block chain. In one embodiment, a block chain is temporally sequential listing 204 that records one or more new at least a digitally signed assertion 200 in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a digitally signed assertion 200 listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the temporally sequential listing 204 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be crypto-currency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in temporally sequential listing 204 may contain a record or at least a digitally signed assertion 200 describing one or more addresses that receive an incentive, such as virtual currency, as the result of successfully mining the sub-listing 208.

With continued reference to FIG. 2, where two entities simultaneously create new sub-listings 208, temporally sequential listing 204 may develop a fork; protocol may determine which of the two alternate branches in the fork is the valid new portion of the temporally sequential listing 204 by evaluating, after a certain amount of time has passed, which branch is longer. "Length" may be measured according to the number of sub-listings 208 in the branch. Length may be measured according to the total computational cost of producing the branch. Protocol may treat only at least a digitally signed assertion 200 contained the valid branch as valid at least a digitally signed assertion 200. When a branch is found invalid according to this protocol, at least a digitally signed assertion 200 registered in that branch may be recreated in a new sub-listing 208 in the valid branch; the protocol may reject "double spending" at least a digitally signed assertion 200 that transfer the same virtual currency that another at least a digitally signed assertion 200 in the valid branch has already transferred. As a result, in some embodiments the creation of fraudulent at least a digitally signed assertion 200 requires the creation of a longer temporally sequential listing 204 branch by the entity attempting the fraudulent at least a digitally signed assertion 200 than the branch being produced by the rest of the participants; as long as the entity creating the fraudulent at least a digitally signed assertion 200 is likely the only one with the incentive to create the branch containing the fraudulent at least a digitally signed assertion 200, the computational cost of the creation of that branch may be practically infeasible, guaranteeing the validity of all at least a digitally signed assertion 200 in the temporally sequential listing 204.

Still referring to FIG. 2, additional data linked to at least a digitally signed assertion 200 may be incorporated in sub-listings 208 in the temporally sequential listing 204; for instance, data may be incorporated in one or more fields recognized by block chain protocols that permit a person or computer forming a at least a digitally signed assertion 200 to insert additional data in the temporally sequential listing 204. In some embodiments, additional data is incorporated in an unspendable at least a digitally signed assertion 200 field. For instance, the data may be incorporated in an OP_RETURN within the BITCOIN block chain. In other embodiments, additional data is incorporated in one signature of a multi-signature at least a digitally signed assertion 200. In an embodiment, a multi-signature at least a digitally signed assertion 200 is at least a digitally signed assertion 200 to two or more addresses. In some embodiments, the two or more addresses are hashed together to form a single address, which is signed in the digital signature of the at least a digitally signed assertion 200. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a digitally signed assertion 200 are typical crypto-currency addresses, such as addresses linked to public keys as described above, while one or more additional addresses in the multi-signature at least a digitally signed assertion 200 contain additional data related to the at least a digitally signed assertion 200; for instance, the additional data may indicate the purpose of the at least a digitally signed assertion 200, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using at least a digitally signed assertion 200 as described above.

Still referring to FIG. 2, at least a digitally signed assertion 200 may be included data structures or memory 108 elements besides a temporally sequential file, including without limitation any temporary or persistent memory 108 as used in or by any computing device as described above in reference to FIG. 1. For example, and without limitation, at least a digitally signed assertion 200 may include one or more encrypted or otherwise secured or partitioned memory 108 entries as entered for instance using a secure computing protocol as described in further detail above.

Referring again to FIG. 1, requestor-linked data store 140 may include a local database 152 and/or a multi-nodal secure datastore 148. Local database 152. A data store may include a repository for persistently storing and managing collections of data which may include databases. Commonly known data stores include MATLAB, VMware, and Firefox OS. Local database 152 may include an organized collection of data, which may be stored and accessed electronically from for example, a computer system. A database may support storage and manipulation of data, whereby data and collected information contained in a database may be updated and edited and reformed as events may occur that may change data. A database may include a series of bytes that may be managed by a database management system. A database management system may be used to enable users who access a database to edit and/or update information contained within a database. A database management system may by implemented using software and/or hardware. A software system used to maintain a database management system may include a relational database management system (RDBMS) which may use structured query language (SQL) for querying and maintaining the database. RDBMS may organize data into one or more tables or relations of columns and rows with each row having a unique key to identity each row. Rows may also include records or tuples. Columns may also include attributes. Each table and/or relation may represent one entity type and each row may represent instances of that type of entity, and each column may represent values attributed to that instance. Each row in a table may have its own unique key. A unique key may include a unique value that the system recognizes for accessing a row in a table. Keys may be used to define relationships among the tables. Relationships may include a logical connection between different tables, established on the basis of interaction among these tables. Data may also be stored in models other than tabular relations as in RDBMS such as in not only structured query language (NoSQL) or non-relational databases. NoSQL or non-relational databases may provide a mechanism for storage and retrieval of data in means other than tabular relations as in RDBMS. NoSQL may classify data in means such as for example column document, key-value, and/or graph. Column classification may include databases such as for example Accumulo, Cassandra, Druid, Hbase, and/or Vertica. Document may classify data store as documents that encapsulate and encode data. Encodings may include for example, XML, YAML, JSON, and/or B SON. Document store may include for example, Apache, CouchDB, ArangoDB, BaseX, Clusterpoint, Couchbase, Cosmos DB, IBM Domino, MarkLogic, Mongo DB, Orient DB, Qizx, and/or Rethink DB. Key-value stores may use associative arrays whereby data is represented as a collection of key-value pairs such that each possible key appears at most once in the collection. Key-value databases may include for example Aerospike, Apache Ignite, Arango DB, Berkeley DB, Couchbase, Dynamo, Foundation DB, Infinity DB, Memcache DB, MUMPS, Oracle NoSQL database, Orient DEB, Redis, Riak, SciDB, SDBM/Flat file dbm and/or Zookeeper. Graph database may consist of elements interconnected with a finite number of relations between them. This may include for example, Allegro Graph, Arango DB, Infinite Graph, Apache Giraph, MarkLogic, Neo4J, OrientDB, and/or Virtuoso. Access to the local database 152 may be provided by a database management system that may include software that interacts with end users, applications, and the database itself to capture and analyze the data. Local data may be local to application that is being used or performed on it. Local database 152 may store data and may be invisible to replication so that collections of data in a local database 152 are not replicated. In an embodiment, local database 152 may include a central administrator or centralized data storage of information. In an embodiment, segregating requestor-linked data store 140 to include a multi-nodal secure datastore 148 or a multi-nodal secure datastore 148 and a local database 152 will be described in more detail in reference to FIG. 4.

Figure 3:
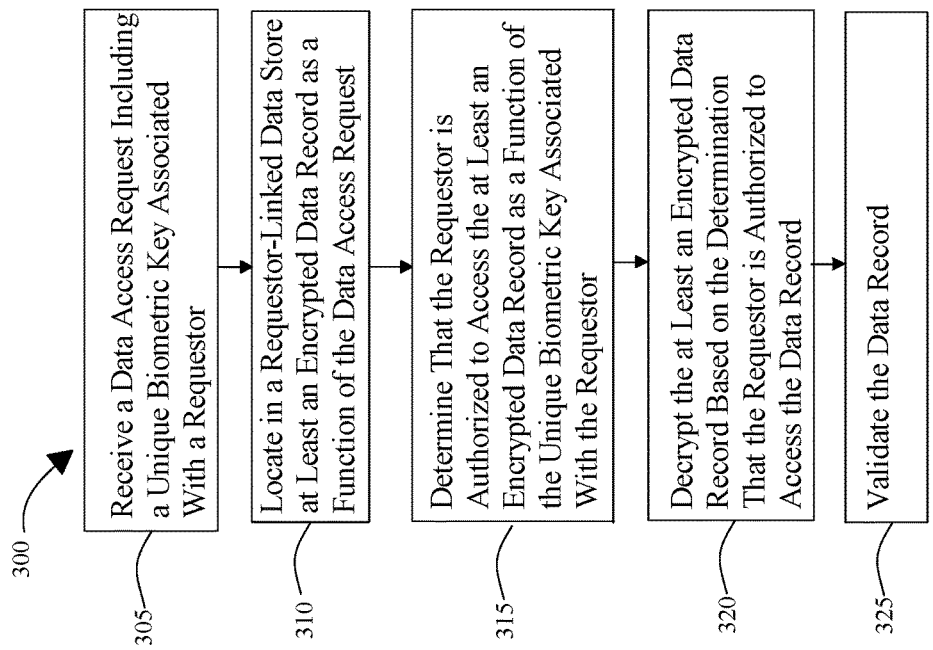
FIG. 3 is a flow diagram illustrating an exemplary embodiment of a method for using biometric key generation for data access control and path selection.

Referring now to FIG. 3, a method 300 for using biometric key generation for data access control and path selection is illustrated. At step 305 access control regulator 112 receives a data access request 136 including a unique key associated with the requestor. Unique key may include, without limitation, a unique biometric key. Data access request 136 as used herein is a request by a requestor to access an encrypted data record in the requestor-linked data store. Data access request 136 may include for example, a request by a requestor to access requestor-linked data store 140 pertaining to requestor employment history. In yet another non-limiting example, data access request 136 may include a request by requestor to access requestor-linked data store 140 pertaining to a degree requestor may have achieved at a college or university. In an embodiment, data access request 136 may be received by access control regulator electronically, for example over a network. In an embodiment, data access request 136 may include a request to access all records contained in requestor-linked data store 140. In yet another non-limiting example, data access request 136 may include a request to access only one or some portion of records contained in requestor linked data store 140. For example, requestor may seek out records pertaining to a specific period of time that requestor was employed but may not need all employment records stored in requestor-linked data store 140. Data access request 136 may include a unique key associated with a requestor. As used herein, unique key associated with a requestor includes a key uniquely identifying requestor which grants permission for requestor to access requestor-linked data store 140. Unique key associated with the requestor associated with a requestor may include a unique biometric key generated from a biometric sample of requestor, and/or a unique key generated from any other requestor-specific information, including without limitation secret information known to requestor such as a password or other element of data. For example, unique key associated with the requestor may include a key and/or key pair such as a public and corresponding private key store stored on a user device. A key and/or key pair generated from a requestor device, may be unique to requestor because it may include requestor identifying information located on requestor device. A public key and a private key may be generated by a number of different algorithms as described above. A unique biometric key associated with a requestor may be generated from a bodily feature of requestor which may be unique identifying characteristics of a requestor, which may then be filtered out and used to generate a biometric key. Bodily features of requestor that may be used to generate a biometric key may include a face, a finger, a thumb, an eye, an iris, a retina, a blood composition, a skin or tissue, and the like. A unique biometric key may be generated by capturing a bodily feature from a biometric sensor. A biometric sensor may include a scanner or reader or other input mechanism that may scan, read, analyze, or otherwise produce a biometric key produced from a bodily feature of a requestor. Biometric sensor may include a broad range of technology, such as optical scanners, capacitive scanners, ultrasonic scanners, and/or other scanners as described in more detail above in reference to FIG. 1. Biometric scanner may have a transmitter for transmitting scanned biometric data to a requestor, for example. Biometric data may include unique identifying characteristics of a requestor which may be extracted from the biometric sample, filtered and used to generate a unique biometric key. For example, a biometric sensor scanning a fingerprint of a requestor may produce biometric data such as arches, whorls, loops, edges, minutiae, and furrows which may then be analyzed and filtered to generate a unique biometric key associated with biometric scan of requestor fingerprint. Unique biometric key may alternatively or additionally be generated from behavioral biometrics as described above. Unique biometric key associated with a requestor may include at least one of a public key and a private key generated from a requestor biometric sample as described in more detail above in reference to FIG. 1. This may include for example, a public key generated from a biometric scan of a requestor, a private key generated from a biometric scan of a requestor, and/or a public and private key pair generated from a biometric scan of a requestor. Requestor may be a user of system 100. Reception and/or association of unique key associated with requestor may include receiving a digital signature, where the digital signature may be generated from a key linked to requestor. For example, a digital signature may be generated from a public and private biometric key pair generated from a biometric sample.

Continuing to refer to FIG. 3, at step 310 access control regulator 104 locates, in requestor-linked data store 140, at least an encrypted data record 144 as a function of the data access request. Requestor-linked data store 140 may include data pertaining to requestor which may be part of a profile of requestor. Requestor-linked data store 140 may include an encrypted data record 144. Requestor-linked data store 140 may be located on a multi-nodal secure datastore 148 or on a multi-nodal secure datastore 148 and a local database 152. Locating by access control regulator 112 may be done by determining which of multi-nodal secure datastore 148 and local database 152 is storing the requestor-linked data store 140. Locating may include referencing by access control regulator 112 a master list which includes a location of requestor-linked data store 140 and whether requestor-linked data store 140 may be located on a multi-nodal secure datastore 148, on a local database 152, or on a combination of the two. A master list may include a hash-table and/or distributed hash table which may be used to locate a requestor-linked data store. For example, a public key associated with a requestor containing location information pertaining to requestor-linked data store 140 may be converted into a series of hash functions. This may occur by converting an entry into a series of integers by using a hash function. A hash function may include any function that may be used to map a set of data which falls into the hash table. Hash functions may be stored in a hash table, where it can be quickly retrieved using a hashed key. The hashed key may then be used to access requestor-linked data store 140 when prompted. Using the hashed key, a hash function may compute an index that may suggest where requestor-linked data store 140 may be found. Locating may also be performed by linking the at least an encrypted data record 144 to a digital signature associated with the requestor. Requestor may produce a digital signature as described above in reference to FIG. 1, which may then be linked to the at least an encrypted data record 144 and locate to the location of the at least an encrypted data record 144. When the digital signature is presented, it may contain location information of the at least an encrypted data record 144 and allow access control regulator 112 to locate the precise location of encrypted data record 144. For example, digital signature may be generated using a public and/or private key linked to requestor which may contain location information of encrypted data record 144. In an embodiment, encrypted data record 144 may be linked to a requestor key, so that when a requestor key is presented, location of encrypted data record 144 becomes apparent. Locating may also be performed by information that may be contained in data access request. For example, a data access request associated with a user may contain location information of encrypted data record 144 that requestor is attempting to access. When generating a data access request, requestor may specify the location of encrypted data record 144 that may then be transmitted to access control regulator 112.

With continued reference to FIG. 3, at step 315 access control regulator 112 determines that the requestor is authorized to access the at least an encrypted data record 144 as a function of the unique key associated with the requestor. Determining that the requestor is authorized to access the at least an encrypted data record 144 may include matching the unique key to a hash of the unique key previously created when the unique key and/or cryptographic hash thereof was generated and stored in system 100. Matching may be performed by comparing a hash generated to produce the unique key to a stored hash of the unique key which may be stored in system 100, for example in cryptographic module. Matching may include comparing the hash values for two inputs. In an embodiment, if hash of unique key and stored value match, then requestor may be authorized to access at least an encrypted data record 144. In an embodiment, if hash of the unique key and hash of stored hash are not identical, then requestor may not be authorized to access at least an encrypted data record 144. In such an instance, the at least a data record may be flagged as having had an unsuccessful attempt to access it. A repeated offense may cause a signal to be generated to requestor to inform requestor be informed that requestor's account has been unsuccessfully accessed. Matching may also include comparing unique key to a key used to produce the digital signature. For example, unique key may include a private key generated based on a bodily feature of requestor. A private key produced from a biometric of requestor may be matched against a private key that may be a part of requestor's digital signature. In an embodiment, a private key generated from a biometric of requestor may also be used to produce requestor's digital signature. Matching may then involve comparing the private keys to ensure they are the same. If the keys are compared and they are the same, then requestor may be authorized to access the at least an encrypted data record 144. In an embodiment, matching could also be performed by comparing a hash of the private key produced from a biometric of requestor to a hash produced from a private key that is part of requestor's digital signature. If the keys and/or hashes are compared and they are not the same, then requestor may not be authorized to access the at least an encrypted data record 144. Matching may also include evaluating a digital signature of requestor with a requestor public key and utilizing the public key to evaluate encrypted data record 144. For example, access control regulator 112 may receive a data access request which includes a digital signature from requestor and a requestor public key. Access control regulator 112 may use requestor public key to evaluate requestor digital signature, and then use requestor public key to evaluate encrypted data record 144. Matching may include ensuring that requestor public key validates and/or verifies both requestor digital signature and encrypted data record 144; i.e., determining that decryption of each digital signature with public key produces the purportedly signed data or a representation thereof as represented by each digital signature. Matching may also be performed through the use of a requestor private key which may be transmitted in a data access request. For example, requestor may transmit to access control regulator 112 requestor private key with the data access request. Matching may include checking that the private key generates the same digital signature that may be stored in a database. In an embodiment, this may include a biometric signature as described above. In an embodiment, matching may also include checking if requestor matches access to encrypted data record 144. For example, requestor may specify in a data access request specific records that requestor seeks access to. Matching may include checking if unique key associated with the requestor authorizes access to encrypted data record 144. If access is permitted, then the request can proceed, but if access if not authorized, then requestor may be flagged. In yet another example, a data access request may include a unique key associated with the requestor which may be used to look up any record pertaining to requestor. Matching may include checking if there are any matching records to what requestor has specified. If there are no matching records, then access may be denied because there is nothing for requestor to access. In yet another example, having no matching records may cause requestor to be flagged, indicating that requestor may be engaging in suspicious activity.

Continuing to refer to FIG. 3, at step 320 access control regulator 112 decrypts the at least an encrypted data record 144 based on the determination that the requestor is authorized to access the data record. Decrypting may include transforming the at least an encrypted data record 144 in its encrypted state back to its unencrypted form. Decrypting may include converting cyphertext back to plaintext. Decryption may be performed manually or automatically, and it may be performed with a set of keys or passwords. In an embodiment, decryption may be performed by a requestor private key. For example, after requestor has been authorized to access the at least an encrypted data record 144, a private key generated from a biometric of requestor may be used to decrypt the at least an encrypted data record 144. Decrypting may also be performed by access control regulator 112 104, specifically by decryption module 120. Decryption module 120 may include any of the hardware and software as described above in reference to FIG. 1.

Figure 4:
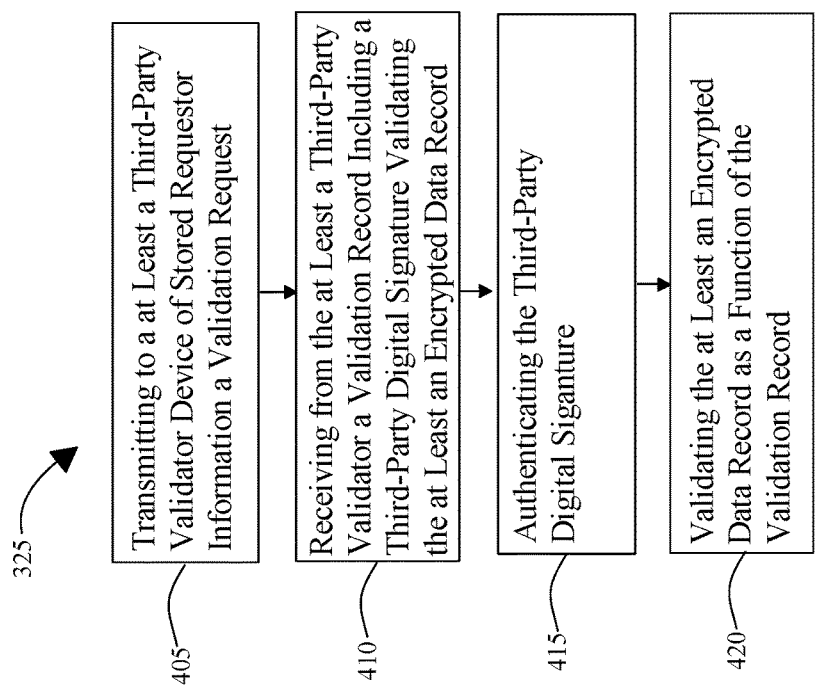
FIG. 4 is a flow diagram illustrating an exemplary embodiment of a method of validating stored requestor information.

Continuing to refer to FIG. 3, at step 325 access control regulator 112 validates stored requestor information. Referring now to FIG. 4, exemplary embodiments of step 325 validating stored requestor information are illustrated. At step 405, access control regulator 112 transmits to a at least a third-party validator device 128 of stored requestor information, a validation request, the validation request providing access to at least a datum of the data record to the at least a third-party validator device 128. Transmitting may include transmitting a part or all of encrypted and/or decrypted data record 144. For example, what part of data record 144 may be transmitted may be determined by the contents of encrypted data record 144. For example, transmission of identifying information of requestor may be sent to third-party validator 128 while transmission of employment record may not be transmitted when third-party validator 128 is validating requestor's educational background. In an embodiment, the entire encrypted data record 144 may be transmitted to a third-party validator 128, for example if third-party validator 128 is validating the entire contents of encrypted data record 144, or perhaps if encrypted data record 144 is only a small record pertaining to a narrow window of employment history of requestor. At least a third-party validator device 128 may be operated by an individual other than requestor who can serve to validate an encrypted data record 144 pertaining to requestor as described in more detail above in reference to FIG. 1. In an embodiment, third-party validator device 128 may be operated by a device other than an individual, whereby the device may be able to validate encrypted data record 144 pertaining to a requestor. For example, in an embodiment third-party validator device 128 may be operated by a processor, whereby the processor may validate encrypted data record 144 pertaining to a requestor by engaging in web crawling, whereby a processor may look through different websites to confirm requestor information, as will be described in more detail below. Stored requestor information may include any data that may be located in a requestor-linked data stored such as for example, at least a data record. Validation request may include a request for stored requestor information to be validated by at least a third-party validator device 128. Transmitting the validation request may include transmitting the decrypted data record. For example, after the at least a data record has been decrypted by access control regulator 112, decrypted data record may be transmitted in addition to a validation request to a at least a third-party validator device 128. In an embodiment, this may speed up transaction time by not having at least a third-party validator device 128 decrypt the data. Transmitting the validation request may also include transmitting a decryption key to decrypt the data record. In an embodiment, the at least a data record may be transmitted to at least a third-party validator device 128 in encrypted form in addition to a validation request and a decryption key. Upon receipt of the at least a data record, at least a third-party validator device 128 may use the decryption key to decrypt the at least a data record. Decryption may be performed by any of the methods as described above in reference to FIG. 3. In an embodiment, third-party validator device 128 may not be able decrypt encrypted data record 144. In such an instance, encrypted data record 144 may be sent via secure socket layer communication. Secure socket layer communication may include a digital signature that may be digitally signed by a digital certificate which may be located on third-party validator device 128. A digitally signed digital certificate verifies that third-party validator device has been authenticated before highly sensitive information is transmitted. This may ensure that decrypted information and/or decryption keys are being sent to an authenticated third-party validator device, as a means to ensure further safety when such information may be transmitted.

Continuing to refer to FIG. 4, at step 410, access control regulator 112 receives from the at least a third-party validator device 128, a validation record including a third-party digital signature validating the at least an encrypted data record 144. Validation record may be used to attest to the accuracy and veracity of encrypted data record 144 pertaining to requestor. Validation record includes a third-party digital signature validating the at least an encrypted data record 144 pertaining to requestor. Validation record may be used to attest to the accuracy and veracity of encrypted data record 144 pertaining to requestor by at least a third-party validator device 128. In an embodiment, validation record may be transmitted from third-party validator device 128 to data security management device 104 to indicate that requestor-linked data store 140 has been validated. A transmission may include an electronic signal and/or message from third-party validator device 128 to data security management device 104. In an embodiment, an electronic signal may be transmitted over a network for example. At least a third-party validator device 128 may verify the at least an encrypted data record 144 pertaining to requestor through an application programmer interface (API), through a Digital Doc, or the like. At least a third-party validator device 128 may create a profile similar to requestor profile. As at least a third-party validator device 128 creates a profile, at least a third-party validator device 128 may create a known third-party identifier, which uniquely identifies and confirms the accuracy of identifying that at least a third-party validator device 128 is who at least a third-party validator device 128 claims to be. Third-party identifier may include a digital signature and/or biometric identifier. Third-party identifier allows at least a third-party validator device 128 to be authenticated and remembered so that at least a third-party validator device 128 may perform multiple validations. Validation record may include a third-party digital signature. As at least a third-party validator device 128 creates a validation record, a digital signature may be generated with the validation record. Digital signature may be created using a hashing function, and it may include a combination of a validation record and/or a public and/or private key and/or key pair. In an embodiment, a public and private key pair may be mathematically related, so that whatever is encrypted with a public key may only be decrypted by its corresponding private keys. A public key and a private key may be generated by a number of different algorithms. This may include for example, Rivest-Shamir-Adleman (RSA), digital signature algorithm (DSA), and/or elliptic curve cryptography (ECC). In an embodiment, third-party digital signature may be generated using a third-party biometric identifier. A third-party identifier may include various identifiers such as for example, a biometric digital signature (biometric signature), a verification datum generated from a previous biometric identification, and/or public and/or private keys generated from a biometric identifier of a third-party. This may be done by using a biometric reader, which may be any device, module, or combination thereof suitable for use as biometric reader 108 to create a unique third-party identifier as done for requestor as described above. In an embodiment, a hashing function may include a hashing algorithm that may create a unique 64-character code for a digital content of 32 bytes and act as a fingerprint for a validation record. Validation record may include a combination of requestor and third-party validator information and/or data. Validation record may vary based on the type of encrypted data record 144 that is presented to at least a third-party validator device 128 to validate.

With continued reference to FIG. 4, at step 415 access control regulator 112 authenticates the third-party digital signature. Authentication may be performed by comparing the third-party digital signature to a known third-party identifier. Known third-party identifier may uniquely identify and confirm the accuracy of identifying that at least a third-party validator device 128 is who at least a third-party validator device 128 claims to be. Third-party identifier may be stored in memory 108 of access control regulator 112 104 on for example, a third-party identifier database. Third-party identifier database may contain third-party identifiers that have been previously collected, generated, and confirmed. For example, third-party identifier may include a known third-party digital signature. A known third-party digital signature may include a previously generated digital signature that had been authenticated at an earlier point in time. Third-party identifier may also include a known third-party biometric identifier. A known third-party biometric identifier may include a previously obtained biometric identifier such as a biometric key generated from a bodily feature of requestor. A known third-party biometric identifier may have been previously authenticated at an earlier point in time, and may be stored on a third-party identifier database, for example to serve as a reference point for subsequent comparisons. Third-party digital signature may be authenticated by comparing the third-party digital signature to a stored third-party identifier. A stored third-party identifier may include an identifier of third party that may be stored on system 100, such as in key retrieval module 124. Stored third-party identifier may include a public key linked to third-party validator device 128 that may be used to validate a third-party digital signature. Stored public key linked to third-party validator may be compared to a public key used to generate a third-party digital signature. Stored third-party identifier may include a stored verification datum from a prior verification performed by a third-party validator. For example, a third-party validator device 128 may be used to verify several different requestor-linked data stores 140 linked to different requestors, and at different points in time. After performing a verification of a first requestor linked data store, third-party identifier may be stored for subsequent verifications which may take place seconds, minutes, days, weeks, months, or even years later. Stored third-party identifier may then be compared to an identifier presented by third-party validator device 128 at a later point in time. Stored third-party identifier may include a stored hash of authentication credentials received from an identifier of third-party validator device. Stored hash of authentication credentials may be compared to a hash received from an identifier of third-party validator device 128. If the hashes match, then authentication can proceed. In an embodiment, hashes that do not match and have not been authenticated may be quarantined and subject to further inspection. Continuing to refer to FIG. 4, at step 420 access control regulator 112 validates the at least an encrypted data record 144 as a function of the validation record. Validation record may be used to attest to the accuracy and veracity of encrypted data record 144 pertaining to requestor by at least a third-party validator device 128. Validated encrypted data record 144 may then be segregated and stored either on the multi-nodal secure datastore 148, the local database 152, and/or any combination thereof.

Still viewing FIG. 3, segregating may include using business logic to segregate validated encrypted data record 144 for storing. Segregating may include deciding which parts of validated requestor-linked data store 140 will be stored whether in multi-nodal secure datastore 148, the local database 152, and/or any combination thereof. Segregating may include storing the at least an encrypted data record 144 on the multi-nodal secure datastore 148. Multi-nodal secure database 148 may include any of the devices and/or data structures as described above in reference to FIGS. 1-4. Storing may also include segregating the at least an encrypted data record 144 for storing on the local database 152. The local database 152 may include any of the devices and/or data structures as described above in reference to FIG. 1.

Continuing to view FIG. 3, data security management device 104 may store data in local database 152 where data is likely be utilized by system 100 frequently or in the near future. For instance, and without limitation, where requestor and/or an employer or other entity to whom data is likely to be conveyed is geographically proximate to data security management device 104, data may be stored in local database 152, because a geographically proximate user, requestor, or other entity may be more likely to retrieve data than a geographically distant user, requestor, or other entity; geographical proximity may include location within a radius from data security management device 104 of less than a threshold amount, location in the same state, city, province, department, country, or the like with data security management device 104, and/or greater proximity to data security management device 104 than to other devices operating and/or incorporated in system 104. Geographical location of requestor and/or other user or entity may be entered by such requestor and/or other user or entity, may be determined using global positioning system (GPS) data obtained from a device operated by requestor and/or other user or entity, or by any other suitable means that may occur to a person skilled in the art upon reviewing the entirety of this disclosure. In an embodiment, where geographical proximity is not found, data may be stored on multi-nodal secure datastore 148; another device that is geographically proximate may load data from multi-nodal secure datastore 148 to another local database or data store. Alternatively or additionally, requestor may enter information indicating that a series of accesses to data will be necessary in the near future; for instance requestor may be applying for jobs or admission to academic institutions, and a process flow stored on data security management device 104 may indicate that the requestor is in early stages of the application process such that access to data will be frequent until the process is concluded, causing data security management device 104 to store data in local database 152 until the application process has concluded. Generally, local database 152 may be used for non-verified and/or non-validated data generated in or received by system 100. Local database 152 may also be used for quick retrieval for purposes of analysis and/or provision to third parties' services and/or validators as described elsewhere in this disclosure.

Still referring to FIG. 3, in some embodiments data security management device 104 may store segregate data between local database 152 and multi-nodal secure datastore 148 according to categories of data. For instance requestor-created materials or contents may be stored in local database 152, while biographical data of requestor, such as biographical data that has been verified and/or validated as described herein, may be stored in multi-nodal secure datastore 148. Data may be stored redundantly: that is, some data may be stored in both local database 152 and in multi-nodal secure datastore 148, allowing the data to be locally accessible rapidly for data security management device 104 while simultaneously being stored in a durable, secured, and distributed fashion in multi-nodal secure datastore 148.

With continued reference to FIG. 4, in an embodiment, a score may be calculated as a function of the validation record. For example, a validation record that indicates requestor-linked data store 140 has been validated by a third-party validator device 128, may then proceed on to receive a score. A validation record that indicates requestor-linked data store 140 has not been validated or has been flagged for further review, may not have a score calculated. In an embodiment, score may be calculated by third-party validator device 128, after validation has occurred. Score may be calculated by software running on third-party validator device 128. In yet another non-limiting embodiment, score may be calculated by a processor located on system 100. Score may include calculations pertaining to requestor. In an embodiment, score may be calculated by a talent risk assessment for candidates (TRAC). TRAC may include a career score calculated based on attributes presented by a requestor. In an embodiment attributes may include skill score, validator integrity, candidate reliability, achievement/certificates, social engagement, background screening, active volunteer, academic merit, and experience merit. Scores may be calculated based on the percentage weight allocated to each attribute. For example, in an embodiment attributes may be weighted as follows: skill score 30%, validator integrity 20%, candidate reliability 10%, achievement/certificates 10%, social engagement 10%, background screening 5%, active volunteer 5%, academic merit 5%, and experience merit 5%. In an embodiment, percentage weight allocated to each attribute may be modified. This may be modified for example by employers and/or recruiters who can customize percentage weight based on their individual goal. After score has been calculated, score may be transmitted to a service 132. In an embodiment, an algorithm may be applied to a score to determine which service a requestor may engage with. Service 132 may include recruitment service 132, electronic learning service 132, job board service 132, mentoring service 132, vendor management service 132, and/or payroll service 132 as described in more detail above in reference to FIG. 1. Score may also be used to calculate a reward for requestor. In an embodiment, reward may include a dollar equivalent reward. Dollar equivalent reward may be transferred to requestor through the use of an e-wallet.

Figure 5:
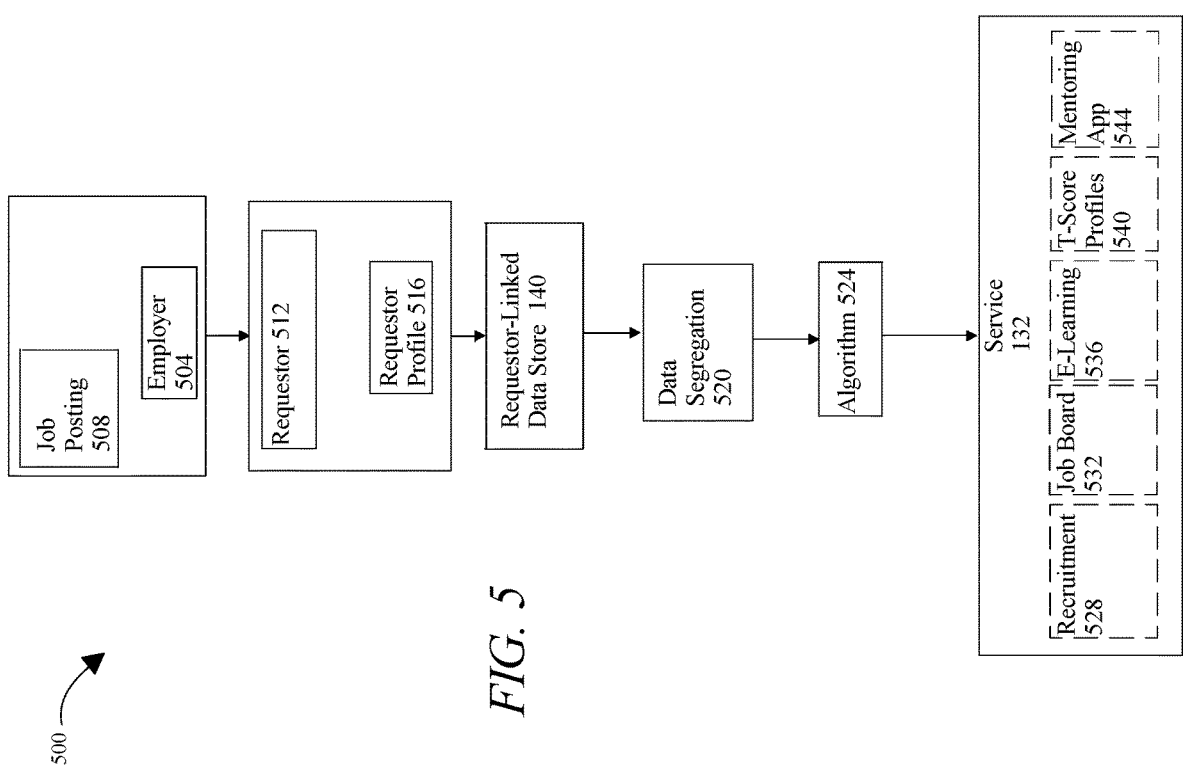
FIG. 5 is a process flow diagram of an overview of an exemplary embodiment of a method for using biometric key generation for data access control for processing employment records.

Referring now to FIG. 5, an overview of a process flow diagram 500 using biometric key generation for processing employment records is illustrated. Employer 504 may publish a job posting 508 on an applicant tracking system such as system 100. Requestor 512 may see job posting 508 and may create a requestor profile 516 in system 100. Requestor profile 516 may include background and demographic information and may include information such as requestor date of birth, email, cell phone number, social security number, driving license number, passport number, employment history, skills, academic details, and/or social engagements. Requestor profile 516 may include data collected under categories such as candidate employment history, pre-employment screening, academic details, and social engagement activities. Requestor profile 516 may be stored in requestor-linked data store 140. Requestor profile 516 may be encrypted. Requestor profile 516 may be validated by certain third-party validators. Third-party validators may create a profile and confirm identity to attest to requestor profile 516. Data collected to create a third-party validator profile may include for example, background information such as third-party validator date of birth, email, mobile, social security number, driver license #, passport #, as well as third-party validator employment history, third-party validator skills, third-party validator academic details, third-party validator social engagement, third-party validator skill. Third-party validator may be an employer and may be an authorized person from an organization. For example, this may be a person from human resources and/or a manager. When third-party validator is an employer, third-party validator may be authenticated by providing an employer organization ID. Requestor 512 may seek validator from a third-party validator by sharing an attestation request to third-party validator by email for attestation. A third-party validator may update last working details of requestor 512 for example, by updating and attesting to information contained in API. In an embodiment, a third-party validator consisting of an employer can invoke API to internal employees at the organization to verify requestor profile 516. In an embodiment, third-party validator is an organization such as a background screening company, Data may be extracted from a background screening company after requestor 512 has allowed for this type of verification. Third-party validator consisting of a background screening company may validate his/her identification through background screening company ID. In an embodiment, requestor 512 may initiate a pre-employment screening through API which may include background information as described above. In an embodiment, a third-party validator consisting of a background screening company may export data to API to validate requestor profile 516. Third-party validator may also consist of social media websites. In an embodiment, a processor and/or user may engage in web crawling to track social engagement activity of a user. In an embodiment, web crawling may include the use of data analytics tool and algorithms to authenticate requestor profile 516. Third-party validator may validate requestor profile 516 through API or Digital Doc. In an embodiment, when a third-party validator authenticates information, third-party validator may include a digital signature tagged to the validation. Digital signature may be created by any of the methods as described above in reference to FIG. 104.

Continuing to view FIG. 5, validation may be segregated into different types of validation, for example trusted validation may include peers or employers who may validate a requestor profile 516 through social media and/or email. Genesis validation may include a third-party validator who may be an organization or employer. A third-party validator may also include a background screening company. Requestor-linked data store containing requestor information 140 may be located on a multi-nodal secure datastore 148 and/or a local database 152. Multi-nodal secure datastore 148 may include at least a distributed node. Data that is obtained from requestor-linked data store 140 may be subjected to data segregation 520. Data extracted from requestor-linked data store 140 may also be subjected to algorithms 524 and then passed on to different services 132. Service 132 may include recruitment 528, job board 532, e-learning 536, T-score profiles 540, and/or mentoring 544. Service 132 may be chosen based on a TRAC score assigned to a requestor. Recruitment services 528 may include a requestor profile 516 that has been tagged with a TRAC score based on a percentage weight of different attributes. Attributes that may create a TRAC score may include for example, skill score, validator integrity, candidate reliability, achievement/certificates, social engagement, background screening, active volunteer, academic merit, and/or experience merit. Scores may be derived based on the weightage allocated for each attribute. In an embodiment, an employer and/or recruiter can go through with a default weightage or may customize weightage based on their goal. E-Learning service 536 may also be implemented for a requestor 512 based on a TRAC score. In an embodiment, an algorithm may be applied to recommend a course to improve a TRAC score. Service 132 may also include job board 532 whereby algorithms may extract jobs from Talenting partners and source it to internal members. Service 132 may also include mentoring 544 wherein requestor 512 may be paired up with a mentor to enhance requestor's career. In an embodiment, an algorithm may be applied to infuse and pair up requestor 512 with a mentor. In an embodiment, other services 132 may include vendor management services and/or payroll services. In an embodiment, feedback may be provided to a requestor and/or employer or academic institution; for instance a requestor may receive information indicating missed employment opportunities and suggestions from employers and/or generated by system 100 indicating additional coursework, credentials, or other improvements to the requestor's biographical data and/or presentation that may improve requestor's chances in future applications.

Figure 6:
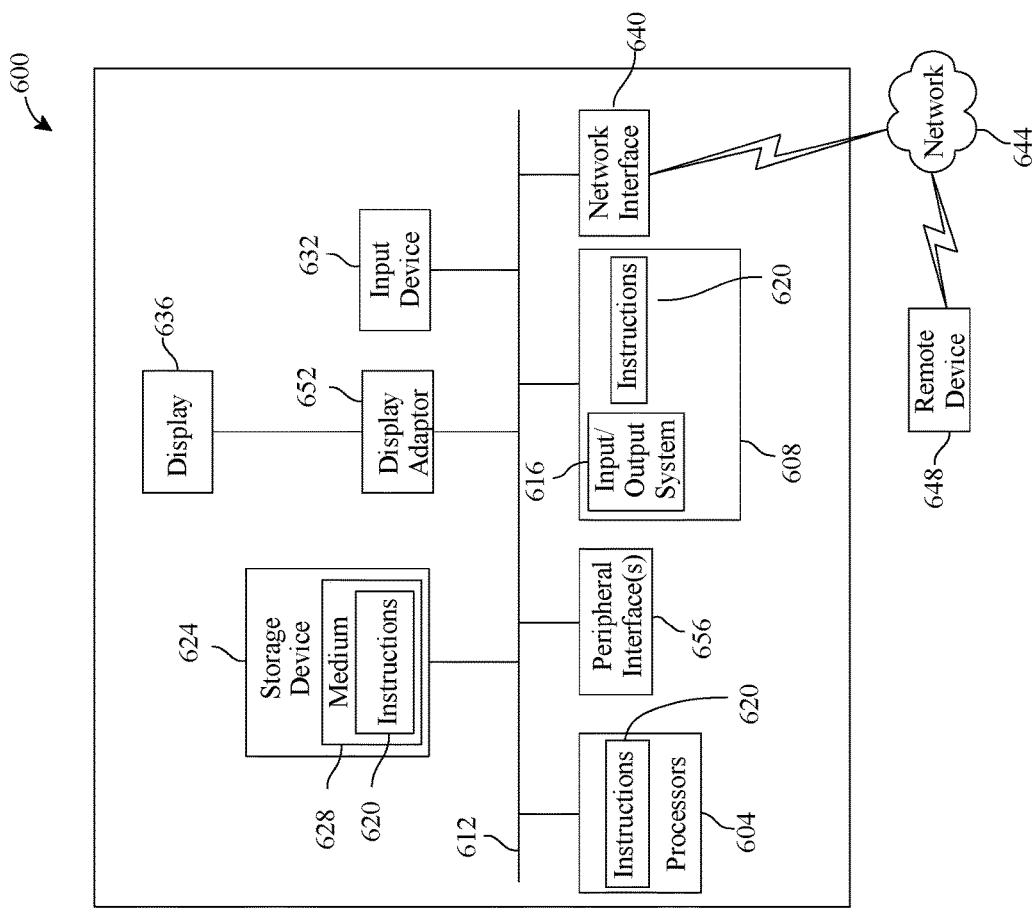
FIG. 6 is a block diagram of a computing system that can be used to implement any one or more of the methodologies disclosed herein and any one or more portions thereof. FIG.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a requesting device 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within requesting device 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with requesting device 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for using biometric key generation in data access control and path selection, the system comprising:
   a biometric reader designed and configured to capture a biometric sample from a requestor and generate a unique biometric key associated with the requestor;
   a data security management device in communication with the biometric reader, wherein the data security management device stores, in a requestor-linked data store, at least an encrypted data record from the requestor, wherein the requestor-linked data store includes a local database and a multi-nodal secure datastore, and wherein the data security management device determines whether to store the encrypted data record to the local database or the multi-nodal secure datastore based upon whether the requestor is geographically proximate to the data security management device;
an access control regulator operating on the data security management device wherein the access control regulator is designed and configured to:
  receive a data access request including the unique biometric key associated with the requestor;
  locate in the requestor-linked data store, the at least an encrypted data record as a function of the data access request, wherein the at least an encrypted data record is linked to a digital signature associated with the requestor;
  determine that the requestor is authorized to access the at least an encrypted data record, wherein determining further comprises:
    matching the unique biometric key to the digital signature associated with the requestor; and
    determining, as a function of the matching, that the requestor is authorized to access the at least an encrypted data record; and
  decrypt, the at least an encrypted data record based on the determination that the requestor is authorized to access the data record; and
a data integrity validator operating on the data security management device, wherein the data integrity validator is designed and configured to validate stored requestor information, wherein validating further comprises:
  transmitting, to a at least a third-party validator device of stored requestor information, a validation request;
  receiving, from the at least a third-party validator device, a validation record including a third-party digital signature validating the at least an encrypted data record;
  authenticating the third-party digital signature; and
  validating the at least an encrypted data record as a function of the validation record.

2. A system for using biometric key generation in data access control and path selection, the system comprising:
  a data security management device that stores, in a requestor-linked data store, at least an encrypted data record from a requestor, wherein the requestor-linked data store includes a local database and a multi-nodal secure datastore, and wherein the data security management device determines whether to store the encrypted data record to the local database or the multi-nodal secure datastore based upon whether the requestor is geographically proximate to the data security management device;
  an access control regulator operating on the data security management device wherein the access control regulator is designed and configured to:
    receive, a data access request including a unique key associated with the requestor;
    locate, in the requestor-linked data store, the at least an encrypted data record as a function of the data access request;
    determine, that the requestor is authorized to access the at least an encrypted data record, as a function of the unique key associated with the requestor;
    decrypt, the at least an encrypted data record based on the determination that the requestor is authorized to access the data record; and
  a data integrity validator operating on the data security management device, wherein the data integrity validator is designed and configured to validate stored requestor information, wherein validating further comprises:
    transmitting, to the at least a third-party validator device of stored requestor information, a validation request, the validation request providing access to at least a datum of the data record to the at least a third-party validator device;
    receiving, from the at least a third-party validator device, a validation record including a third-party digital signature validating the at least an encrypted data record;
    authenticating the third-party digital signature; and
    validating the at least an encrypted data record as a function of the validation record.

3. The system of claim 2, wherein the unique key further comprises a unique biometric key.

4. The system of claim 2, wherein locating further comprises determining which of the multi-nodal secure datastore and the local database is storing the data record.

5. The system of claim 2, wherein the data record includes requestor biographical data.

6. The system of claim 2, wherein determining that the requestor is authorized to access the at least an encrypted data record further comprises:
  matching the unique key associated with the requestor to the digital signature associated with the requestor; and
  determining, as a function of the matching, that the requestor is authorized to access the at least an encrypted data record.

7. A method for using biometric key generation in data access control and path selection, the method comprising:
  a data security management device storing, in a requestor-linked data store, at least an encrypted data record from a requestor, the requestor-linked data store including a local database and a multi-nodal secure datastore, and the data security management device determining whether to store the encrypted data record to the local database or the multi-nodal secure datastore based upon whether the requestor is geographically proximate to the data security management device;
  receiving, by an access control regulator operating on the data security management device a data access request including a unique key associated with a requestor;
  locating, by the access control regulator, in the requestor-linked data store, at least an encrypted data record as a function of the data access request;
  determining, by the access control regulator, that the requestor is authorized to access the at least an encrypted data record, as a function of the unique key associated with the requestor;
  decrypting, by the access control regulator, the at least an encrypted data record based on the determination that the requestor is authorized to access the data record; and
  validating, by a data integrity validator operating on the data security management device, the data record, wherein validating further comprises:
    transmitting, to a at least a third-party validator device of stored requestor information, a validation request;
    receiving, from the at least a third-party validator device, a validation record including a third-party digital signature validating the at least an encrypted data record;
    authenticating the third-party digital signature; and
    validating the at least an encrypted data record as a function of the validation record.

8. The method of claim 7, wherein the unique key further comprises a unique biometric key.

9. The method of claim 7, wherein:
   locating further comprises determining which of the multi-nodal secure datastore and the local database is storing the data record.

10. The method of claim 7, wherein determining that the requestor is authorized to access the at least an encrypted data record further comprises:
    matching the unique key to the digital signature associated with the requestor; and
    determining, as a function of the matching, that the requestor is authorized to access the at least an encrypted data record.

11. The method of claim 7, wherein authenticating the third-party digital signature further comprises comparing the third-party digital signature to a third-party biometric identifier.

12. The method of claim 7 further comprising calculating a score as a function of the validation record.

13. The method of claim 12, wherein:
    at least one of the encrypted data record and the validation record includes biographical data; and
    calculating the score further comprises calculating the score as a function of the biographical data.

14. The method of claim 13 further comprising transmitting the score to a service.

* * * * *